United States Patent
Takeuchi

(10) Patent No.: US 11,565,392 B2
(45) Date of Patent: Jan. 31, 2023

(54) DUST COLLECTING SYSTEM

(71) Applicant: MAKITA CORPORATION, Anjo (JP)

(72) Inventor: Hajime Takeuchi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 397 days.

(21) Appl. No.: 16/830,466

(22) Filed: Mar. 26, 2020

(65) Prior Publication Data
US 2020/0306946 A1    Oct. 1, 2020

(30) Foreign Application Priority Data

Mar. 26, 2019 (JP) .............................. JP2019-059375

(51) Int. Cl.
| | | |
|---|---|---|
| *B25D 11/00* | (2006.01) | |
| *B25D 16/00* | (2006.01) | |
| *B25D 17/20* | (2006.01) | |
| *B23Q 11/00* | (2006.01) | |

(52) U.S. Cl.
CPC ........ *B25D 11/005* (2013.01); *B23Q 11/0046* (2013.01); *B23Q 11/0071* (2013.01); *B25D 16/00* (2013.01); *B25D 17/20* (2013.01); *B25D 2217/0057* (2013.01); *B25D 2250/095* (2013.01); *B25D 2250/221* (2013.01)

(58) Field of Classification Search
CPC ............ B23Q 11/0046; B23Q 11/0071; B25D 11/005; B25D 16/00; B25D 17/20; B25D 2217/0057; B25D 2250/0095; B25D 2250/221
USPC ......................................................... 408/67
See application file for complete search history.

(56) References Cited

U.S. PATENT DOCUMENTS

| | | | | |
|---|---|---|---|---|
| 4,574,226 A | * | 3/1986 | Binder | .................. B23B 45/02 318/434 |
| 6,222,285 B1 | * | 4/2001 | Haley | ..................... H02P 25/14 307/38 |
| 6,615,930 B2 | * | 9/2003 | Bongers-Ambrosius | .................... B23Q 1/0009 173/198 |
| 6,913,088 B2 | * | 7/2005 | Berger | ................. B25D 17/043 173/48 |

(Continued)

FOREIGN PATENT DOCUMENTS

JP          2018-058188 A       4/2018

*Primary Examiner* — Thomas M Wittenschlaeger
*Assistant Examiner* — David G Shutty
(74) *Attorney, Agent, or Firm* — Oliff PLC

(57) ABSTRACT

A dust collecting system includes a power tool configured to perform processing operation on a workpiece by driving a tool accessory and a dust collector configured to collect dust generated by the processing operation. The power tool includes a first motor, a driving mechanism, a body housing, a first detecting device, an operation member and a second detecting device. The first detecting device is configured to detect an operation of pressing the tool accessory against the workpiece. The operation member is configured to be externally operated by a user. The second detecting device is configured to detect an operation of the operation member. The dust collector includes a second motor and a fan. The dust collecting system includes a first control device configured to control driving of the second motor based on detection results of the first detecting device and the second detecting device.

15 Claims, 9 Drawing Sheets

(56) References Cited

U.S. PATENT DOCUMENTS

| | | | |
|---|---|---|---|
| 7,296,323 B2* | 11/2007 | Hayama | B23Q 11/0046 |
| | | | 15/327.6 |
| 7,966,691 B2* | 6/2011 | Takahashi | A47L 9/2821 |
| | | | 15/352 |
| 9,314,855 B2* | 4/2016 | Ookubo | H02P 23/03 |
| 10,486,280 B2* | 11/2019 | Yamamoto | B25F 5/026 |
| 2002/0003045 A1* | 1/2002 | Bongers-Ambrosius | |
| | | | B25D 16/00 |
| | | | 173/201 |
| 2004/0119431 A1* | 6/2004 | Kawano | H02P 7/29 |
| | | | 318/268 |
| 2010/0199453 A1* | 8/2010 | Brotto | B23D 59/006 |
| | | | 15/301 |
| 2012/0073077 A1* | 3/2012 | Ishikawa | A47L 9/2842 |
| | | | 15/347 |
| 2015/0129248 A1* | 5/2015 | Nitsche | B25D 11/005 |
| | | | 173/2 |
| 2017/0232565 A1* | 8/2017 | Machida | B25F 5/00 |
| | | | 173/198 |
| 2018/0099391 A1 | 4/2018 | Umemoto et al. | |
| 2019/0030669 A1* | 1/2019 | Wu | B23Q 11/0071 |
| 2020/0246954 A1* | 8/2020 | Yamada | B25D 17/11 |
| 2020/0306946 A1* | 10/2020 | Takeuchi | B25D 16/00 |

* cited by examiner

FIG. 2
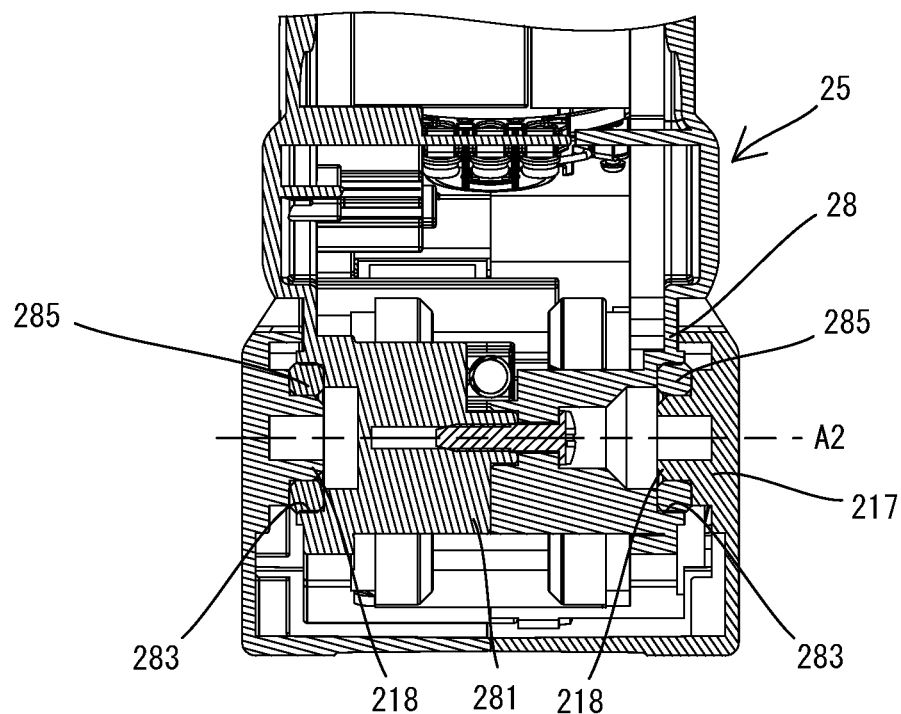
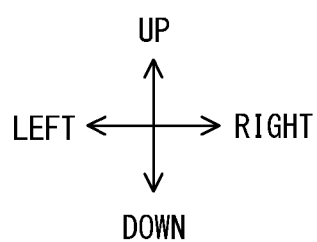

DUST COLLECTING SYSTEM

CROSS-REFERENCE TO RELATED APPLICATION

The present application claims priority to Japanese patent application No. 2019-59375 filed on Mar. 26, 2019, contents of which are fully incorporated herein by reference.

TECHNICAL FIELD

The present disclosure relates to a dust collecting system that includes a power tool and a dust collector.

BACKGROUND ART

A dust collecting system is known which includes a power tool configured to perform processing operation on a workpiece by driving a tool accessory and a dust collector configured to be attached to the power tool to collect dust generated by the processing operation (see, for example, Japanese non-examined laid-open patent publication No. 2018-58188).

SUMMARY

The present disclosure provides a dust collecting system which includes a power tool and a dust collector. The power tool is configured to perform processing operation on a workpiece by driving a tool accessory. The dust collector is configured to collect dust generated by the processing operation. The tool accessory is attached to the power tool so as to extend along a driving axis defining a front-rear direction.

The power tool includes a first motor, a diving mechanism, a body housing, a first detecting device, an operation member and a second detecting device. The driving mechanism is configured to drive the tool accessory by power of the first motor. The body housing houses the first motor and the driving mechanism. The first detecting device is configured to detect an operation of pressing the tool accessory against the workpiece. The operation member is configured to be externally operated by a user. The second detecting device is configured to detect an operation of the operation member. The dust collector includes a second motor and a fan. The fan is configured to be rotationally driven by the second motor to generate air flow for collecting dust. The dust collecting system includes a first control device configured to control driving of the second motor based on detection results of the first detecting device and the second detecting device. It is noted that "pressing the tool accessory against the workpiece" in the present aspect may be rephrased as a shift from a state in which a load is not applied to the tool accessory (hereinafter referred to as an unloaded state) to a state in which a load is applied to the tool accessory (hereinafter referred to as a loaded state).

BRIEF DESCRIPTION OF THE DRAWINGS

FIG. 2 is a sectional view taken along line II-II in FIG. 1.

DETAILED DESCRIPTION OF THE EMBODIMENTS

Figure 1:
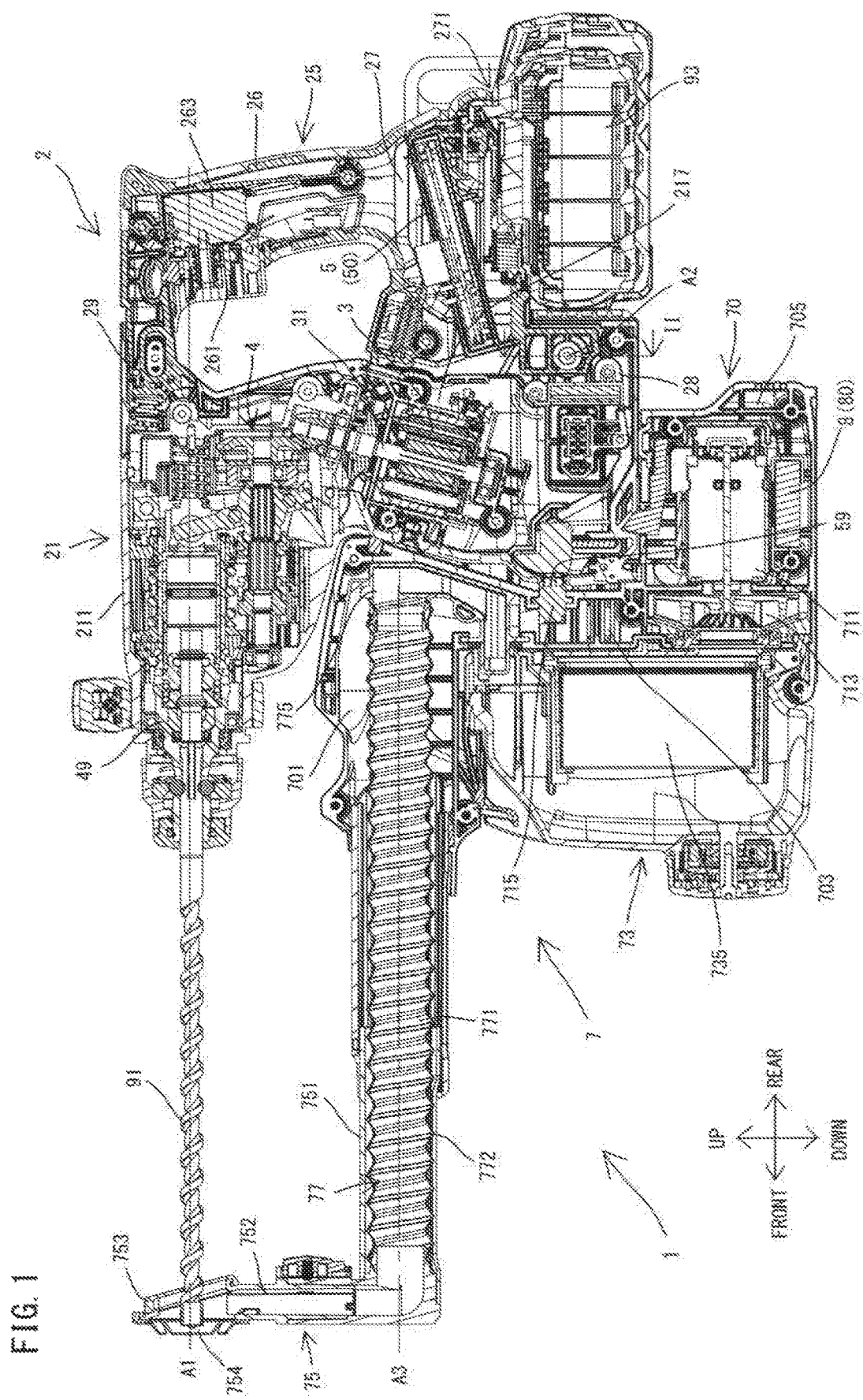
FIG. 1 is a sectional view showing a dust collecting system.

A dust collecting system 1 according to an embodiment of the present disclosure is now described with reference to the drawings. As shown in FIG. 1, the dust collecting system 1 of the present embodiment includes a hammer drill 2 and a dust collector 7. The hammer drill 2 is configured to perform processing operation (such as chipping operation and drilling operation) by driving a removably coupled tool accessory 91 by power of a driving motor 3. More specifically, the hammer drill 2 is configured to perform hammering motion of linearly driving the tool accessory 91 along a driving axis A1 and drilling motion of rotationally driving the tool accessory 91 around the driving axis A1. The chipping operation is performed by the hammering motion, and the drilling operation is performed by the drilling motion. Further, the dust collector 7 is configured to be removably attached to the hammer drill 2, and to collect dust generated by the processing operation.

First, the general structure of the hammer drill 2 is described with reference to FIG. 1.

As shown in FIG. 1, an outer shell of the hammer drill 2 is mainly formed by a body housing 21 and a handle 25. The body housing 21 mainly includes a driving-mechanism-housing part 211 which houses a driving mechanism 4, and a motor-housing part 217 which houses the driving motor 3. The body housing 21 is generally L-shaped in a side view as a whole.

The driving-mechanism-housing part 211 is formed as an elongate box-like body, and extends along the driving axis A1. A tool holder 49, to which the tool accessory 91 can be removably coupled, is disposed within one end portion of the driving-mechanism-housing part 211 in a driving-axis-A1 direction. The motor-housing part 217 is formed as an elongate box-like body and protrudes in a direction away from the driving axis A1 from the other end portion of the driving-mechanism-housing part 211 in the driving-axis-A1 direction. The driving motor 3 is disposed within the motor-housing part 217 such that a rotation axis of a motor shaft 31 extends in a direction which intersects the driving axis A1 (specifically, in a direction which is oblique to the driving axis A1).

In the following description, for convenience sake, an axial direction of the driving axis A1 (also referred to as the driving-axis-A1 direction) is defined as a front-rear direction of the hammer drill 2, and in the front-rear direction, the one end side on which the tool holder 49 is provided is defined as a front side (also referred to as a front-end-region side) of the hammer drill 2, while its opposite side is defined as a rear side. Further, a direction which is orthogonal to the driving axis A1 and which corresponds to an axial direction of the rotation axis of the motor shaft 31 is defined as an up-down direction of the hammer drill 2. In the up-down direction, a direction toward which the motor-housing part 217 protrudes is defined as a downward direction, while its opposite direction is defined as an upward direction. Furthermore, a direction which is orthogonal to the front-rear direction and the up-down direction is defined as a left-right direction.

The handle 25 is generally C-shaped in a side view as a whole. Both ends of the handle 25 are connected to a rear end portion of the body housing 21. The handle 25 includes a grip part 26 to be held by a user. The grip part 26 is arranged apart rearward from the body housing 21 and extends generally in the up-down direction, crossing the driving axis A1. A trigger 261 is provided on a front side of an upper end portion of the grip part 26. The trigger 261 is configured to be depressed by a user. Further, a battery-mounting part 271 is provided on a lower end portion of the handle 25. The battery-mounting part 271 is configured to removably receive a rechargeable battery (also referred to as a battery pack) 93, which is a power source for the driving motor 3.

The detailed structure of the hammer drill 2 is now described.

First, the internal structure of the body housing 21 is described.

As described above, the driving mechanism 4 is housed in the driving-mechanism-housing part 211. The driving mechanism 4 is configured to drive the tool accessory 91 by power of the driving motor 3. In the present embodiment, the driving mechanism 4 includes a motion-converting mechanism, a striking mechanism and a rotation-transmitting mechanism. The motion-converting mechanism is configured to convert rotation of the motor shaft 31 into linear motion and transmit it to the striking mechanism. In the present embodiment, the motion-converting mechanism is of a type using a swinging member. The striking mechanism is configured to linearly operate to strike the tool accessory 91, thus linearly driving the tool accessory 91 along the driving axis A1. In the present embodiment, the striking mechanism includes a striker and an impact bolt. The rotation-transmitting mechanism is configured to decelerate rotation of the motor shaft 31 and then transmit it to the tool holder 49, thus rotationally driving the tool accessory 91. The rotation-transmitting mechanism includes a plurality of gears. An operation mode (a hammer drill mode, a drill mode and a hammer mode) of the hammer drill 2 may be switched by a mode-switching mechanism (not shown). The mode-switching mechanism may appropriately interrupt power transmission in the motion-converting mechanism or in the rotation-transmitting mechanism according to a user's operation of a mode-switching dial (not shown). The structures of the driving mechanism 4 and the mode-switching mechanism are known and therefore not described in detail.

As described above, the motor-housing part 217 is connected to the rear end portion of the driving-mechanism-housing part 211 of the body housing 21 and extends downward. The driving motor 3 is housed in an upper portion of the motor-housing part 217. In the present embodiment, a direct current (DC) brushless motor is adopted as the driving motor 3. The driving motor 3 includes a motor body, which includes a stator and a rotor, and a motor shaft 31, which extends from the rotor and rotates together with the rotor. The rotation axis of the motor shaft 31 extends obliquely downward and forward relative to the driving axis A1. Further, a portion (specifically, a lower connection part 28) of the handle 25 is disposed within a lower rear portion (that is, in a region located on a lower side of the driving motor 3) of the motor-housing part 217. Furthermore, a recess for fixing the dust collector 7 is provided in a front end portion of the lower portion of the motor-housing part 217. A connector 59 is provided in this recess and configured to be electrically connected to a connector 715 of the dust collector 7.

Next, the detailed structure of the handle 25 and its internal structure are described.

As shown in FIG. 1, the handle 25 includes the grip part 26, a controller-housing part 27, the lower connection part 28 and the upper connection part 29. In the present embodiment, the handle 25 is formed by right and left halves being connected together at plural points by screws with internal components (described below) assembled in the halves.

As described above, the grip part 26 is arranged to extend in the up-down direction, and the trigger 261 is provided on a front side of the upper end portion of the grip part 26. The grip part 26 has an elongate cylindrical shape and houses a switch 263 inside. The switch 263 is normally kept in an OFF state and turned ON in response to an operation of depressing the trigger 261. The switch 263 is thus configured to detect depressing and releasing of the trigger 261. Further, the switch 263 is connected to a controller 5 (specifically, a control circuit 50), which will be described below, via a wiring (not shown). The switch 263 is configured to output to the controller 5 a signal indicating an ON state (i.e. a signal indicating the operation of depressing the trigger 261) (hereinafter referred to as an ON signal) or a signal indicating an OFF state (i.e. a signal indicating release of the operation of depressing the trigger 261) (hereinafter referred to as an OFF signal).

The controller-housing part 27 is connected to a lower side of a lower end portion of the grip part 26. The controller-housing part 27 has a rectangular box-like shape and extends forward of the grip part 26. The controller 5 is housed in the controller-housing part 27. The controller 5 includes a case, a board housed in the case and a control circuit 50 (see FIG. 7) mounted on the board. In the present embodiment, the controller 5 is configured to control driving of the driving motor 3 based on detection results of the switch 263 and a position sensor 61 described below (see FIG. 5), which will be described below in detail.

A lower end portion (a portion below the controller 5) of the controller-housing part 27 is formed as the battery-mounting part 271, which is configured to removably receive the battery 93. The battery-mounting part 271 has a pair of guide rails which can be slidingly engaged with guide grooves of the battery 93, which is a well-known structure and therefore is not shown in the drawings and not described in detail. The battery 93 can be mounted to the battery-mounting part 271 by sliding forward from the rear with the guide grooves engaged with the guide rails. When the battery 93 is mounted to the battery-mounting part 271, connectors of the battery 93 and the battery-mounting part 271 are electrically connected to each other.

The lower connection part 28 is a portion of the handle 25 which is connected to a front end portion of the controller-housing part 27 and extends generally downward. The upper connection part 29 is a portion of the handle 25 which is connected to an upper end portion of the grip part 26 and extends forward. In the present embodiment, the handle 25 is connected to the body housing 21 so as to be movable relative to the body housing 21 via the lower and upper connection parts 28 and 29. Connecting structures between the lower and upper connection parts 28 and 29 and the body housing 21 are now described in detail.

As shown in FIG. 1, the lower connection part 28 is arranged to protrude into a lower rear end portion of the motor-housing part 217. The lower connection part 28 is connected to a lower rear end portion of the body housing 21 (specifically, the motor-housing part 217) so as to be pivotable around a pivot axis A2, which extends in the left-right direction. Further, as described above, the driving motor 3 is disposed in the upper portion of the motor-housing part 217, but a free space exists below the driving motor 3 in the motor-housing part 217. Therefore, in the present embodiment, by utilizing this free space, the lower connection part 28 is arranged to connect the handle 25 and the motor-housing part 217.

As shown in FIG. 2, the lower connection part 28 has a shaft part 281 which extends in the left-right direction between left and right walls of the lower connection part 28, such that a center axis of the shaft part 181 coincides with the pivot axis A2. More specifically, the left and right halves forming the handle 25 respectively have two protruding portions extending to the right and left along the pivot axis A2. The shaft part 281 is formed by connecting these protruding portions with a screw. Recesses 283 are respectively formed in positions corresponding to both ends of the shaft part 281 on outer surfaces of the left and right walls of the lower connection part 28. Each of the recesses 283 is configured to have a circular section centering the pivot axis A2. An annular elastic member 285 is fitted in each of the recesses 283.

Protruding parts 218 are provided to protrude to the right and left from inner surfaces of left and right walls of the motor-housing part 217, respectively. The protruding parts 218 each have a generally circular cylindrical shape. The protruding parts 218 are arranged such that their respective axes extend on a straight line extending in the left-right direction. Each of protruding end portions of the protruding parts 218 is fitted into the elastic member 285 within the recess 283, so that the lower rear end portion of the motor-housing part 217 is connected to the lower connection part 28 via the elastic members 285. By such concavo-convex engagement via the elastic members 285, the lower connection part 28 is connected to the motor-housing part 217 so as to be pivotable around the pivot axis A2 relative to the motor-housing part 217. Further, the lower connection part 28 is configured to be movable in all of the front-rear, left-right and up-down directions relative to the motor-housing part 217 via the elastic members 285.

Figure 3:
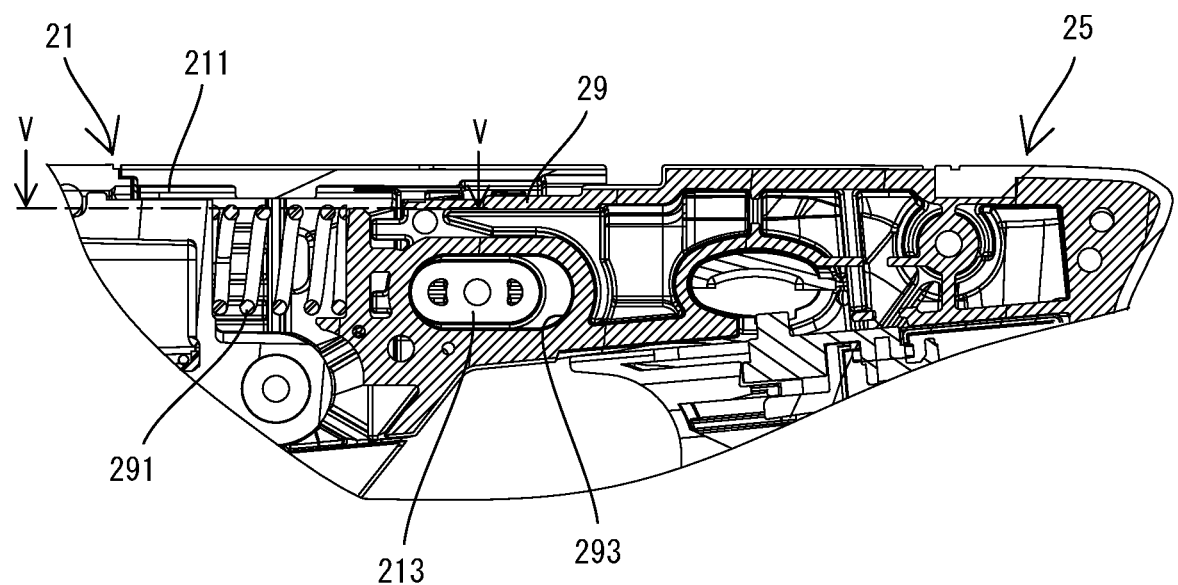
FIG. 3 is a partial, enlarged view of FIG. 1, showing an upper connection part and its surrounding region.

As shown in FIGS. 1 and 3, the upper connection part 29 is arranged to protrude into a rear end portion of the driving-mechanism-housing part 211. The upper connection part 29 is movably connected to an upper rear end portion of the body housing 21 (specifically, the driving-mechanism-housing part 211) via an elastic member 291. In the present embodiment, a compression coil spring is adopted as the elastic member 291. The elastic member 291 is held with its front and rear ends abutted on spring-receiving surfaces which are respectively formed within the rear end portion of the driving-mechanism-housing part 211 and a front end portion of the upper connection part 29. Thus, the elastic member 291 is disposed such that an acting direction of its spring force substantially coincides with the front-rear direction.

Further, the upper connection part 29 has an elongate hole 293 formed behind the elastic member 291. The elongate hole 293 is a through hole extending through the upper connection part 29 in the left-right direction and formed longer in the front-rear direction than in the up-down direction. In this connection, a stopper part 213 is provided inside the driving-mechanism-housing part 211. The stopper part 213 is a columnar part extending in the left-right direction between left and right walls of the driving-mechanism-housing part 211 and inserted through the elongate hole 293.

In a state in which the tool accessory 91 is not pressed against a workpiece and thus not subjected to a load (hereinafter referred to as an unloaded state), the upper connection part 29 is biased in a direction (rearward) away from the body housing 21 in the front-rear direction by the elastic member 291 and held in a position where the stopper part 213 abuts on a front end of the elongate hole 293 and thereby prevents the upper connection part 29 from further moving rearward. This position of the upper connection part 29 (the handle 25) relative to the body housing 21 is referred to as a rearmost position.

Figure 4:
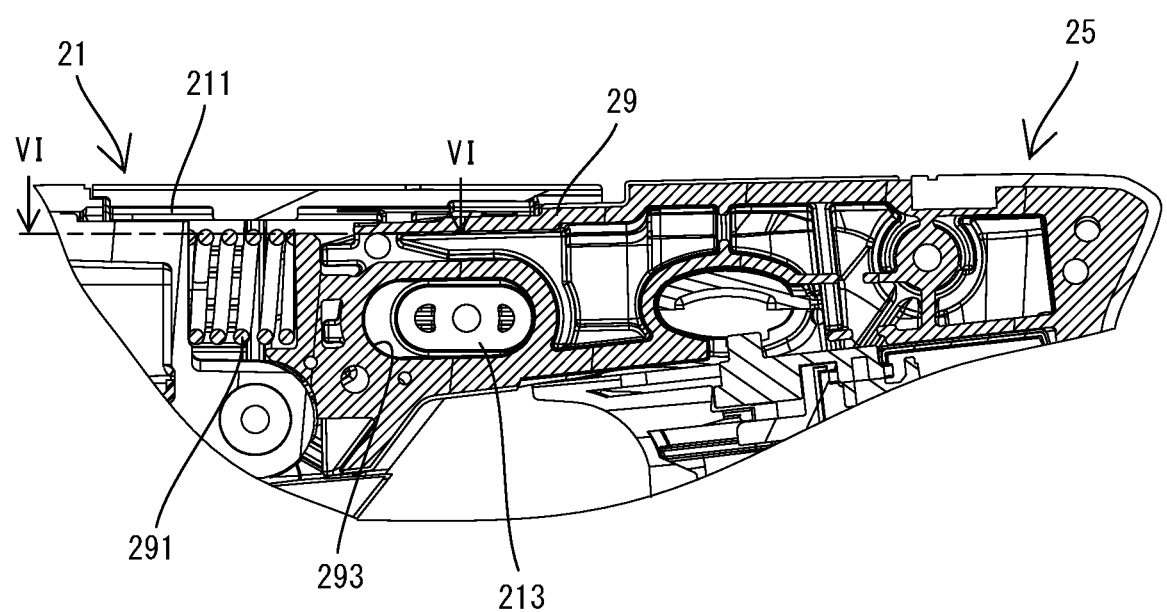
FIG. 4 is a view corresponding to FIG. 3 and showing a state in which a handle is moved forward relative to a body housing.

In a state in which the tool accessory 91 is pressed against the workpiece and thus subjected to a load (hereinafter referred to as a loaded state), the handle 25 is turned forward around the pivot axis A2 relative to the body housing 21, and the upper connection part 29 is relatively moved forward from the rearmost position shown in FIG. 3 against biasing force of the elastic member 291. As shown in FIG. 4, the upper connection part 29 is allowed to relatively move forward up to a position where the stopper part 213 abuts on a rear end of the elongate hole 293 and thereby prevents the upper connection part 29 from further moving forward. This position of the upper connection part 29 (the handle 25) relative to the body housing 21 is referred to as a foremost position.

Figure 5:
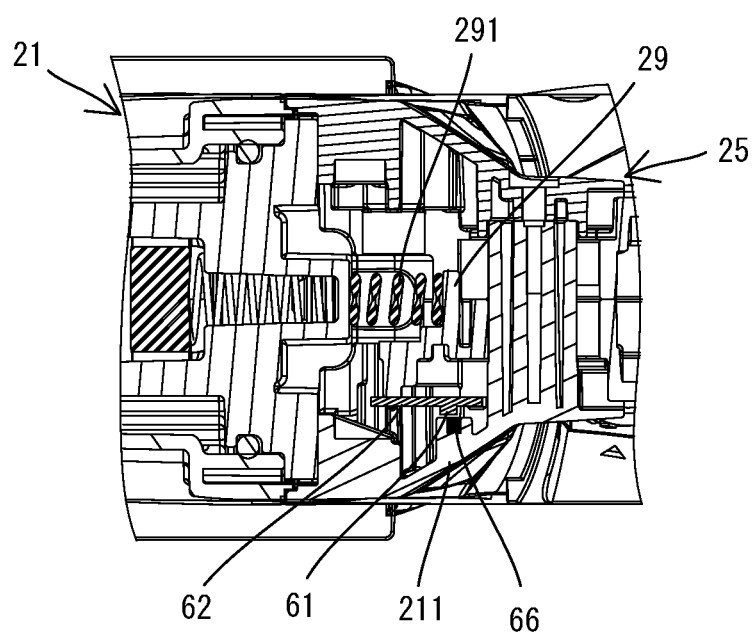
FIG. 5 is a sectional view taken along line V-V in FIG. 3.
Figure 6:
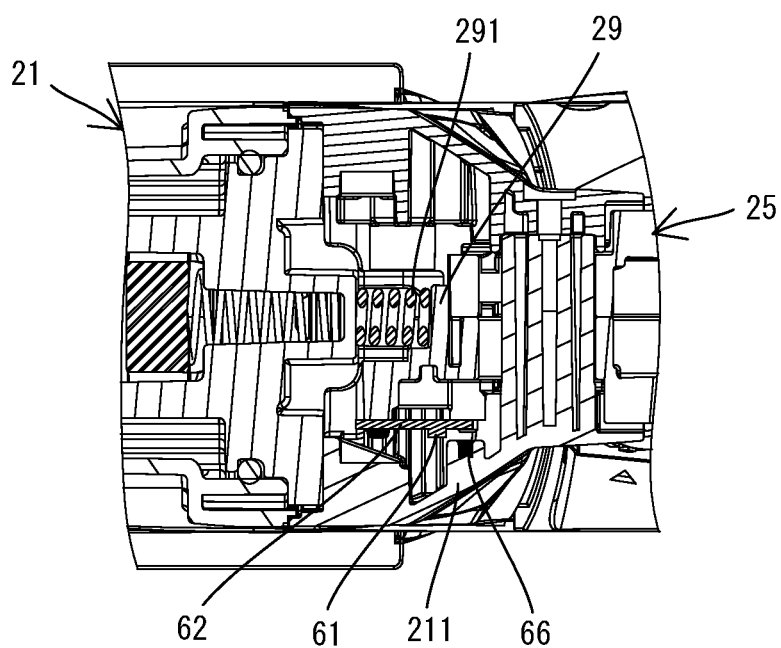
FIG. 6 is a sectional view taken along line VI-VI in FIG. 4.

As shown in FIGS. 5 and 6, a position sensor 61 for detecting the position of the handle 25 relative to the body housing 21 is provided in the upper connection part 29. In the present embodiment, a Hall sensor having Hall elements is adopted as the position sensor 61. The position sensor 61 is mounted on a board 62 and fixed to a left front end portion of the upper connection part 29 so as to face a left wall of the body housing 21 (the driving-mechanism-housing part 211). A magnet 66 is fixed to an inner surface of the left wall of the body housing 21.

The position sensor 61 of the present embodiment has a plurality of Hall elements and is capable of detecting the amount of relative movement of the magnet 66 based on magnetic flux density measured by each of the Hall elements. More specifically, the position sensor 61 is configured to detect the amount of movement of the magnet 66, which moves along with forward relative movement of the handle 25, from a reference position (where the amount of movement is defined as zero). The reference position (initial position) is set as a position where the magnet 66 is located when the handle 25 is located in the rearmost position relative to the body housing 21, as shown in FIG. 5. As shown in FIG. 6, when the handle 25 is moved to the foremost position, the amount of movement of the magnet 66 becomes maximum. In this manner, the position sensor 61 can detect the relative position of the handle 25 relative to the body housing 21 in the form of the amount of movement of the magnet 66 from the initial position.

As described above, the handle 25 is relatively moved forward from the rearmost position along with pressing of the tool accessory 91 against the workpiece, so that, when the amount of movement of the magnet 66 exceeds a specified threshold, the tool accessory 91 can be regarded as being pressed. Further, the amount of movement of the magnet 66 can be regarded as a physical quantity which indicates (corresponds to) a load on the tool accessory 91.

The position sensor 61 is electrically connected to the controller 5 via a wiring (not shown) and configured to output to the controller 5 (specifically, the control circuit 50) a signal corresponding to the amount of movement of the magnet 66 (hereinafter referred to as a position signal).

Next, the dust collector 7 is described. Further, the dust collector 7 is used in a state in which the dust collector 7 is attached to the hammer drill 2. Therefore, in the following description, for convenience sake, directions of the dust collector 7 are defined corresponding to the directions of the hammer drill 2 with the dust collector 7 attached thereto.

First, the general structure of the dust collector 7 is described. As shown in FIG. 1, the dust collector 7 includes a body housing 70, a dust case 73, a sliding part 75 and a dust-transfer passage 77. The body housing 70 is configured to be removably attached to the body housing 21 of the hammer drill 2. The body housing 70 houses a dust-collection motor 711 and a fan 713. The fan 713 is configured to be rotationally driven by the dust-collection motor 711 to generate air flow for collecting dust. The dust case 73 is a container for storing dust. The dust case 73 is removably mounted to the body housing 70. The sliding part 75 is held by the body housing 70 so as to be slidable in the front-rear direction along a sliding axis A3 parallel to the driving axis A1. Further, the sliding part 75 has a cover part 753. The cover part 753 has a suction port 754 for sucking dust and is configured to cover a tip of the tool accessory 91. The dust-transfer passage 77 is a passage through which dust sucked from the suction port 754 is transferred. The dust-transfer passage 77 extends through the inside of the sliding part 75 and is connected to the dust case 73.

When the dust-collection motor 711 is driven and the fan 713 is rotated, dust generated by the processing operation is sucked in through the suction port 754 together with air and led into the dust case 73 through the dust-transfer passage 77. In the dust case 73, only the dust is separated from the air and stored. The air from which the dust has been separated is discharged from an outlet (not shown) formed in the body housing 70. Thus, in the dust collecting system 1, the dust collector 7 collects the dust generated by the processing operation using the hammer drill 2.

The detailed structure of the dust collector 7 is now described.

As shown in FIG. 1, the body housing 70 is a hollow body which is generally Z-shaped in a side view. The body housing 70 includes a sliding-guide part 701, a connector part 703 and a motor-housing part 705.

The sliding-guide part 701 is a rectangular box-like portion forming an upper end portion of the body housing 70. The sliding-guide part 701 has an internal space extending in the front-rear direction. An opening is provided at a front end of the sliding-guide part 701 to provide communication between the internal space and the outside. A structure for holding the sliding part 75 such that the sliding part 75 is slidable in the front-rear direction is provided in the inside of the sliding-guide part 701, which is a well-known structure and therefore is not described in detail and not shown in the drawings.

The connector part 703 is provided on the lower side of a rear end portion of the sliding-guide part 701 and extends in the up-down direction. A rear wall of the connector part 703 has a protruding portion protruding rearward. The connector 715 is provided in this protruding portion to be electrically connected to the connector 59 of the hammer drill 2.

The motor-housing part 705 is a rectangular box-like portion provided on the lower side of the connector part 703 and extending rearward of the connector part 703, and forms a lower end portion of the body housing 70. A pair of guide rails, which extend in the front-rear direction, are respectively formed on upper ends of left and right sides of the motor-housing part 705. Correspondingly, a pair of guide grooves, which extend in the front-rear direction, are respectively provided in lower end portions of left and right sides of the motor-housing part 217 of the hammer drill 2. The guide rails and the guide grooves have well-known structures and therefore are not described in detail and not shown in the drawings. The dust collector 7 can be attached to the body housing 21 of the hammer drill 2 via slide engagement between the guide rails and the guide grooves. When the dust collector 7 is attached to the body housing 21, the protruding portion of the connector 703 is fitted in the recess of the motor-housing part 217 and the connector 715 is electrically connected to the connector 59.

As described above, the motor-housing part 705 houses the dust-collection motor 711, the fan 713 and a controller 8. More specifically, the dust-collection motor 711 is arranged such that its motor shaft extends in the front-rear direction. In the present embodiment, a motor with a brush is adopted as the dust-collection motor 711. The fan 713 is fixed to the motor shaft in front of a motor body (a stator and a rotor) of the dust-collection motor 711 and rotates together with the motor shaft. The fan 713 is a centrifugal fan. An opening is formed in a front wall of the motor-housing part 705 so as to face a suction area of the fan 713. The controller 8 includes a case, a board housed in the case and a control circuit 80 (see FIG. 7) mounted on the board. When the dust collector 7 is attached to the body housing 21 as described above, the controller 8 is connected to the controller 5 of the hammer drill 2 via the connectors 715 and 59. In the present embodiment, the controller 8 is configured to control driving of the dust-collection motor 711 based on detection results of the switch 263 and the position sensor 61, which will be described below in detail.

As shown in FIG. 1, the dust case 73 is a rectangular box-like container. The dust case 73 has an inlet, through which dust-containing air flows in, and an outlet, through which air from which dust has been separated, flows out. The outlet communicates with the opening of the motor-housing part 705 which is formed in front of the fan 713. A filter 735 is disposed within the dust case 73. The air which has passed through the filter 735 flows out of the dust case 73 into the motor-housing part 705 via the outlet and is discharged to the outside of the dust collector 7 from a discharge outlet (not shown).

As shown in FIG. 1, the sliding part 75 is a tubular member which is generally L-shaped in a side view as a whole. The sliding part 75 includes a first tubular part 751 linearly extending in the front-rear direction and a second tubular part 752 extending upward from a front end portion of the first tubular part 751. The cover part 753 is provided on an upper end of the second tubular part 752 and configured to cover the tip of the tool accessory 91. The suction port 754 extends through the cover part 753 in the front-rear direction. The sliding part 75 is held by the body housing 70 such that a portion of the first tubular part 751 is always located within the sliding-guide part 701 while the second tubular part 752 including the cover part 753 protrudes forward from the sliding-guide part 701.

As shown in FIG. 1, the dust-transfer passage 77 extends through the inside of the sliding part 75 and connects the suction port 754 and the inlet of the dust case 73. The dust sucked in from the suction port 754 is transferred to the dust case 73 through the dust-transfer passage 77. In the present embodiment, the dust-transfer passage 77 is defined by a portion (the second tubular part 752) of the sliding part 75, a hose 771 and a hose connecting part 775. The hose 771 is formed in a bellows shape to be extensible. One end of the hose 771 is connected to a lower end portion of the second tubular part 752. The other end of the hose 771 protrudes rearward from a rear end of the sliding part 75 and is connected to one end portion of the hose connecting part 775. The other end portion of the hose connecting part 775 is inserted into the dust case 73 through the inlet. With this structure, the dust-transfer passage 77 is formed to connect the suction port 754 and the dust case 73.

Further, a spring 772 is fitted on the hose 771. In the present embodiment, a compression coil spring is adopted as the spring 772. The sliding part 75 is always biased forward, that is, in a direction to protrude from the body housing 70, by the elastic force of the spring 772. Therefore, the sliding part 75 is held in an initial position (shown in FIG. 1) while no external force is applied rearward to the sliding part 75 (hereinafter also referred to as an initial state). When the processing operation (such as the drilling operation) is performed with the tip of the tool accessory 91 and the cover part 753 pressed against a workpiece, the sliding part 75 is pushed into the inside of the body housing 70 against the biasing force of the spring 772 as the processing operation proceeds. When the processing operation is completed and the pressing operation is released, the sliding part 75 returns to the initial position by the elastic force of the spring 772.

Figure 7:
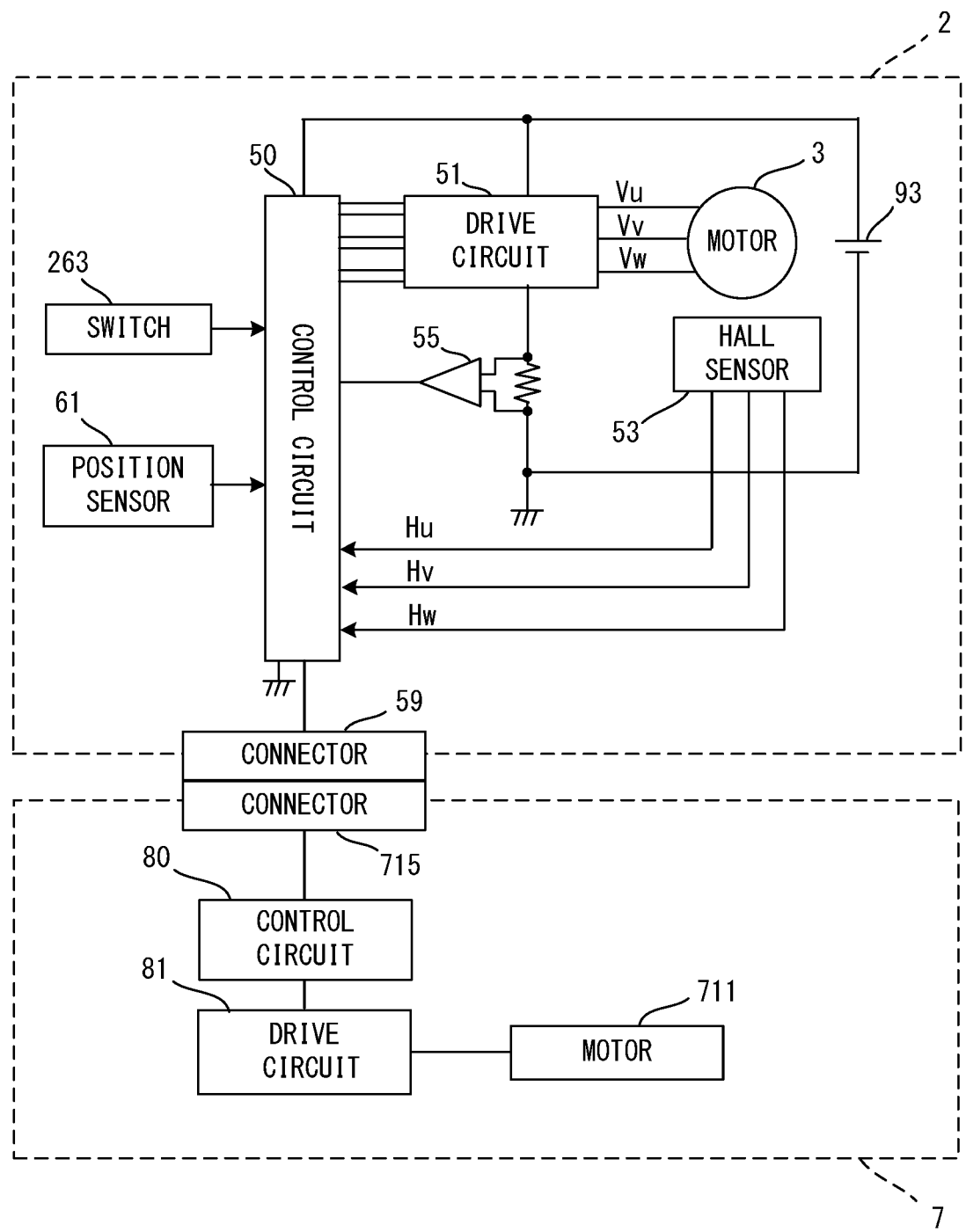
FIG. 7 is a block diagram showing the electrical configuration of the dust collecting system.

The electrical configurations of the hammer drill 2 and the dust collector 7 are now described with reference to FIG. 7.

The hammer drill 2 has the control circuit 50, a drive circuit 51 and a current-detecting amplifier 55 which are mounted on the board of the controller 5. Further, a Hall sensor 53, the switch 263, the position sensor 61 and the connector 59 are electrically connected to the control circuit 50.

In the present embodiment, the control circuit 50 is formed by a microcomputer including a CPU, a ROM, a RAM and a timer. The drive circuit 51 includes a three-phase bridge circuit using six semiconductor switching elements. The current-detecting amplifier 55 converts current flowing through the driving motor 3 into voltage by shunt resistance and further outputs a signal amplified by the amplifier to the control circuit 50. The Hall sensor 53 has three Hall elements which are arranged corresponding to respective phases of the driving motor 3, and outputs a signal indicating a rotation position of the rotor to the control circuit 50. As described above, the switch 263 outputs to the control circuit 50 an ON signal indicating the operation of depressing the trigger 261 or an OFF signal indicating release of the operation of depressing the trigger 261. The position sensor 61 outputs to the controller circuit 50 a position signal corresponding to the amount of movement of the magnet 66.

The control circuit 50 starts or stops driving of the driving motor 3 based on various kinds of signals inputted from the Hall sensor 53, the current-detecting amplifier 55, the switch 263, the position sensor 61 and the like. Further, the control circuit 50 appropriately sets the rotation speed of the driving motor 3 and then sets a drive duty ratio of each of the switching elements according to the rotation speed and outputs a control signal corresponding to the set drive duty ratio to the drive circuit 51. In this manner, the control circuit 50 controls driving of the driving motor 3.

The dust collector 7 has the control circuit 80 and a drive circuit 81 which are mounted on the board of the controller 8. Further, the connector 715 is electrically connected to the control circuit 80. In the present embodiment, like the control circuit 50, the control circuit 80 is formed by a microcomputer including a CPU, a ROM, a RAM and a timer. The drive circuit 81 has a switching element.

As described above, when the dust collector 7 is attached to the body housing 21, the control circuit 80 is electrically connected to the control circuit 50 of the hammer drill 2 via the connectors 715 and 59. The control circuit 50 outputs signals inputted from the switch 263 and the position sensor 61 to the control circuit 80. The control circuit 80 starts and stops driving of the dust-collection motor 711 by switching on and off the switching element of the drive circuit 81 based on these signals. Further, the control circuit 80 appropriately sets the rotation speed of the collection motor 711 and supplies current according to the set rotation speed to the switching element. In this manner, the control circuit 80 controls driving of the dust-collection motor 711.

Operation control in the dust collecting system 1 is now described. In the present embodiment, driving of the driving motor 3 of the hammer drill 2 is controlled by the control circuit 50 of the hammer drill 2, while driving of the dust-collection motor 711 of the dust collector 7 is separately controlled by the control circuit 80 of the dust collector 7.

Figure 8:
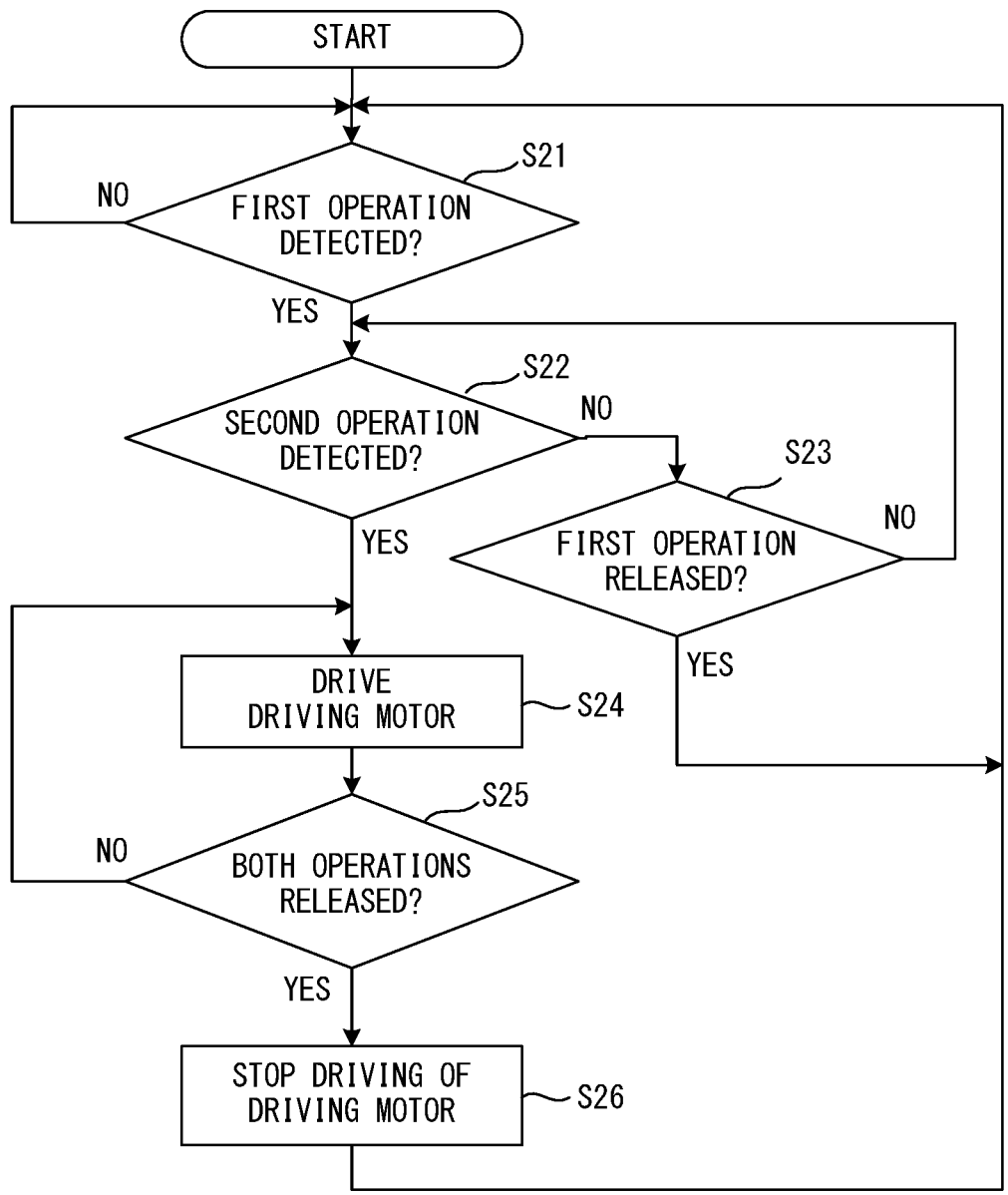
FIG. 8 is a flowchart showing drive control processing of a driving motor.

First, drive control processing of the driving motor 3 which is performed by the control circuit 50 (specifically, CPU) of the hammer drill 2 is described in detail with reference to FIG. 8. The drive control processing of the driving motor 3 is started when power supply to the hammer drill 2 is started by the battery 93 being mounted to the battery-mounting part 271. The drive control processing of the driving motor 3 is terminated when the power supply is stopped. In the following description and drawings, each "step" in the processing is simply expressed as "S".

The control circuit 50 first monitors output signals from the switch 263 and the position sensor 61 and waits until a first operation is detected (S21: NO, S21). The first operation refers to either one of the operation of depressing the trigger 261 and the operation of pressing the tool accessory 91 against a workpiece. In a case where the output signal from the switch 263 is the ON signal, the control circuit 50 specifies the operation of depressing the trigger 261 as the first operation. However, in a case where the amount of movement corresponding to the position signal outputted from the position sensor 61 exceeds the specified threshold, the control circuit 50 specifies the operation of pressing the tool accessory 91 against the workpiece as the first operation.

The control circuit 50 determines whether a second operation is detected, based on the output signals from the switch 263 and the position sensor 61 (S22). The second operation refers to the other one of the operations of pressing the tool accessory 91 against a workpiece and depressing the trigger 261, which is different from the one specified as the detected first operation. Specifically, in a case where the operation of depressing the trigger 261 is detected in S21, the control circuit 50 determines in S22 whether or not the operation of pressing the tool accessory 91 is detected. On the other hand, in a case where the operation of pressing the tool accessory 91 is detected in S21, the control circuit 50 determines in S22 whether or not the operation of depressing the trigger 261 is detected. Detection of the second operation means that the trigger 261 is depressed and the tool accessory 91 is pressed against the workpiece and thus is in the loaded state.

In a case where release of the first operation is detected while the second operation is not detected (S22: NO, S23: YES), the control circuit 50 returns to S21. In a case where the first operation is maintained (S23: NO), the control circuit 50 monitors detection of the second operation (S22). In a case where the second operation is detected (S22: YES), the control circuit 50 starts driving of the driving motor 3 (S24). In the present embodiment, the control circuit 50 sets the rotation speed of the driving motor 3 according to the amount of movement of the magnet 66, that is, the load on the tool accessory 91, based on the position signal outputted from the position sensor 61. Specifically, the control circuit 50 drives the driving motor 3 at a rotation speed which is obtained, for example, by multiplying a preset maximum rotation speed by a factor which is smaller than 1 and which corresponds to the amount of movement.

The control circuit 50 determines whether or not the first operation and the second operation are both released, based on the output signals of the switch 263 and the position sensor 61 (S25). In a case where at least one of the first and second operations is maintained (S25: NO), as described above, the control circuit 50 continues to drive the driving motor 3 at the rotation speed set according to the load on the tool accessory 91 (S24). In a case where the first operation and the second operation are both released (S25: YES), the control circuit 50 stops driving of the driving motor 3 (S26) and returns to S21.

As described above, when the operations of depressing the trigger 261 and pressing the tool accessory 91 against the workpiece are both detected, the control circuit 50 of the hammer drill 2 starts driving of the driving motor 3 and drives the driving motor 3 at the rotation speed set according to the load on the tool accessory 91. Further, when the operations of depressing the trigger 261 and pressing the tool accessory 91 against the workpiece are both released during driving of the driving motor 3, the control circuit 50 stops driving of the driving motor 3.

Next, drive control processing of the dust-collection motor 711 which is performed by the control circuit 80 (specifically, CPU) of the dust collector 7 is described in detail with reference to FIG. 9. The drive control processing of the dust-collection motor 711 is started when power supply to the dust collector 7 is started via the hammer drill 2 by the battery 93 being mounted to the battery-mounting part 271. The drive control processing of the dust-collection motor 711 is terminated when power supply is stopped.

The control circuit 80 first monitors output signals from the switch 263 and the position sensor 61 and waits until the first operation (one of the operations of depressing the trigger 261 and pressing the tool accessory 91 against a workpiece) is detected (S71: NO, S71). As described above, the signals from the switch 263 and the position sensor 61 are inputted into the control circuit 80 from the control circuit 50 of the hammer drill 2 via the connectors 59 and 715.

In a case where the first operation is detected (S71: YES), the control circuit 80 starts driving of the dust-collection motor 711 (S72). In the present embodiment, in S72, the dust-collection motor 711 is driven at a preset relatively low rotation speed (initial rotation speed). The initial rotation speed of the dust-collection motor 711 may be stored, for example, in the ROM of the control circuit 80.

The control circuit 80 determines whether or not the second operation (the other one of the operations of depressing the trigger 261 and pressing the tool accessory 91 against a workpiece) is detected, based on the output signals from the switch 263 and the position sensor 61 (S73). In a case where release of the first operation is detected while the second operation is not detected (S73: NO, S74: YES), the control circuit 80 stops driving of the dust-collection motor 711 (S81) and returns to S71. In a case where the first operation is maintained while the second operation is not detected (S73: NO, S74: NO), the control circuit 80 continues to drive the dust-collection motor 711 at the initial rotation speed (S72).

In a case where the second operation is detected (S73: YES), the control circuit 80 increases the rotation speed of the dust-collection motor 711 from the initial rotation speed (S75). In the present embodiment, like the hammer drill 2, the control circuit 80 sets the rotation speed of the dust-collection motor 711 according to the load on the tool accessory 91, based on the position signal outputted from the position sensor 61. The control circuit 80 may drive the driving motor 3 at a rotation speed which is obtained, for example, by multiplying the initial rotation speed by a factor which is larger than 1 and which corresponds to the amount of movement.

The control circuit 80 determines whether or not either one of the first and second operations is released, based on the output signals from the switch 263 and the position sensor 61 (S76). In a case where the first operation and the second operation are maintained (S76: NO), the control circuit 80 continues to drive the dust-collection motor 711 at the rotation speed which is higher than the initial rotation speed and is set according to the load on the tool accessory 91 (S75). In a case where either one of the first operation and the second operation is released (S76: YES), the control circuit 80 reduces the rotation speed to the initial rotation speed, and drives the dust-collection motor 711 at the initial rotation speed (S77).

In a case where both of the operations are detected again (S78: YES), the control circuit 80 continues to drive the dust-collection motor 711 at the rotation speed which is higher than the initial rotation speed and is set according to the load on the tool accessory 91 (S75). In a case where the first operation and the second operation are both released (S78: NO, S79: YES), the control circuit 80 measures elapsed time after the both operations are released, and continues to drive the dust-collection motor 711 at the initial rotation speed until a specified period of time elapses (S80: NO, S77). In a case where the specified time elapses after the both operations are released (S80: YES), the control circuit 80 stops driving of the dust-collection motor 711 (S81) and returns to S71.

As described above, when one of the operations of depressing the trigger 261 and pressing the tool accessory 91 against the workpiece is performed, the control circuit 80 of the dust collector 7 drives the dust-collection motor 711 at the relatively low initial rotation speed. On the other hand, when both of the operations of depressing the trigger 261 and pressing the tool accessory 91 against the workpiece are performed, the control circuit 80 increases the rotation speed of the dust-collection motor 711 according to the load on the tool accessory 91. Further, when both of the operations of depressing the trigger 261 and pressing the tool accessory 91 against the workpiece are released during driving of the dust-collection motor 711, the control circuit 80 continues to drive the dust-collection motor 711 at the initial rotation speed until the specified time elapses, and then stops driving of the dust-collection motor 711 when the specified time elapses.

As described above, the dust collecting system 1 of the present embodiment includes the hammer drill 2 which is configured to perform processing operation by driving the tool accessory 91 using power of the driving motor 3, and the dust collector 7 which is configured to collect dust generated by the processing operation, using power of the dust-collection motor 711. The hammer drill 2 includes the position sensor 61 for detecting the operation of pressing the tool accessory 91 against a workpiece by way of the amount of movement of the magnet 66, and the switch 263 for detecting the operation of depressing the trigger 261. The control circuit 50 of the hammer drill 2 and the control circuit 80 of the dust collector 7 respectively drive the driving motor 3 and the dust-collection motor 711 based on the detection results of the position sensor 61 and the switch 263. Both of the operations of pressing the tool accessory 91 against the workpiece and depressing the trigger 261 may be performed for the hammer drill 2 by the user to start the processing operation. Therefore, driving of the driving motor 3 and driving of the dust-collection motor 711 can be rationally controlled based on the detection results of these operations, so that wasteful power consumption of the driving motor 3 and the dust-collection motor 711 can be reduced.

Particularly, in the present embodiment, in a case where the position sensor 61 detects the operation of pressing the tool accessory 91 or when the switch 263 detects the operation of depressing the trigger 261, the control circuit 80 of the dust collector 7 drives the dust-collection motor 711 at the relatively low initial rotation speed. Performing either one of the operations of pressing the tool accessory 91 against a workpiece and depressing the trigger 261 may indicate that the user is in a preliminary stage for starting the processing operation. Therefore, in such a stage, driving the dust-collection motor 711 at a low speed can realize preparation for quick starting of the processing operation while suppressing wasteful power consumption. On the other hand, in a case where the position sensor 61 detects both the operation of pressing the tool accessory 91 and the switch 263 detects the operation of depressing the trigger 261, the control circuit 50 of the hammer drill 2 starts driving of the driving motor 3. Thus, the hammer drill 2 can start the processing operation in a state where the dust collector 7 can suck dust, while preventing wasteful power consumption in the unloaded state.

Further, in a case where the position sensor 61 detects the operation of pressing the tool accessory 91 and the switch 263 detects the operation of depressing the trigger 261, the control circuit 80 of the dust collector 7 increases the rotation speed of the dust-collection motor 711 from the initial rotation speed. Therefore, the dust collector 7 can efficiently collect dust which is generated when the processing operation is started at full scale.

In the present embodiment, the position sensor 61 detects the amount of movement of the magnet 66 as a physical quantity corresponding to the load on the tool accessory 91 pressed against a workpiece. Further, the control circuit 80 of the dust collector 7 increases the rotation speed of the dust-collection motor 711 from the initial rotation speed, according to the load on the tool accessory 91. The amount of dust generated by the processing operation may vary depending on the load on the tool accessory 91, that is, the degree of pressing the tool accessory 91. By changing the rotation speed of the dust-collection motor 711 according to the load, the dust collector 7 can efficiently collect the dust while suppressing wasteful power consumption. Further, the control circuit 50 of the hammer drill 2 also changes the rotation speed of the driving motor 3 according to the load on the tool accessory 91, so that the hammer drill 2 can efficiently perform the processing operation by the tool accessory 91 while suppressing wasteful power consumption of the driving motor 3.

In the present embodiment, in a case where the position sensor 61 detects that the operation of pressing the tool accessory 91 is released and the switch 263 also detects that the operation of depressing the trigger 261 is released, during driving of the dust collecting motor 711, the control circuit 80 of the dust collector 7 drives the dust-collection motor 711 at the relatively low initial rotation speed for the specified period of time and then stops driving of the dust-collection motor 711. Therefore, after completion of the processing operation by the tool accessory 91, the dust which may remain in the dust-transfer passage 77 extending from the suction port 754 to the dust case 73 can be transferred to the dust case 73. Further, in a case where the position sensor 61 detects that the operation of pressing the tool accessory 91 is released and the switch 263 also detects that the operation of depressing the trigger 261 is released, during driving of the driving motor 3, the control circuit 50 of the hammer drill 2 stops driving of the driving motor 3. In this manner, the control circuit 50 and the control circuit 80 can respectively stop driving of the driving motor 3 and driving of the dust-collection motor 711 at respective optimum timings.

In the present embodiment, the hammer drill 2 includes the body housing 21 which houses the driving motor 3 and the driving mechanism 4, and the handle 25 which is elastically connected to the body housing 21 so as to be movable in the front-rear direction relative to the body housing 21. The position sensor 61 detects the forward movement of the handle 25 relative to the body housing 21 as the operation of pressing the tool accessory 91. When a user holds the grip part 26 of the handle 25 and presses the tool accessory 91 against a workpiece, the handle 25 moves forward relative to the body housing 21. Therefore, the position sensor 61 can appropriately detect the operation of pressing the tool accessory 91 by detecting the relative forward movement of the handle 25. Further, when the tool accessory 91 is driven, vibration is caused in the body housing 21 which houses the driving motor 3 and the driving mechanism 4. However, transmission of vibration from the body housing 21 to the handle 25 (particularly, to the grip part 26) can be suppressed by the relative movement between the body housing 21 and the handle 25.

Correspondences between the features of the above-described embodiment and their modifications and the features of the invention are as follows. It is noted, however, that the features of the above-described embodiment are mere examples which are non-limiting. The dust collecting system 1 is an example of the "dust collecting system". The hammer drill 2 is an example of the "power tool". The driving axis A1 is an example of the "driving axis". The tool accessory 91 is an example of the "tool accessory". The dust collector 7 is an example of the "dust collector". The driving motor 3, the driving mechanism 4, the body housing 21, the position sensor 61, the trigger 261 and the switch 263 are examples of the "first motor", the "driving mechanism", the "body housing", the "first detecting device", the "operation member" and the "second detecting device", respectively. The dust-collection motor 711, the fan 713 and the control circuit 80 are examples of the "second motor", the "fan" and the "first control device", respectively. The amount of movement of the magnet 66 is an example of the "information corresponding to the load". The control circuit 50 is an example of the "second control device". The handle 25 and the grip part 26 are examples of the "elastic-connection part" and the "grip part", respectively.

The above-described embodiment is a mere example, and the dust collecting system according to the present invention is not limited to the structure and the processing of the dust collecting system 1 (the hammer drill 2 and the dust collector 7) of the above-described embodiment. For example, the following modifications may be made. One or more of these modifications may be used in combination with the dust collecting system 1 of the above-described embodiment or the claimed invention.

In the above-describe embodiment, the hammer drill 2 is described as an example of the power tool which is configured to perform processing operation by driving a tool accessory. However, the power tool which can be adopted in the dust collecting system 1 is not limited to the hammer drill 2, and any power tool may be adopted which is used for processing operation (such as drilling and chipping) by which dust may be generated. For example, an electric hammer, a vibration drill and an electric drill may be adopted in place of the hammer drill 2. Further, a hammer drill having only the hammer drill mode and the hammer mode may be adopted. The drive control of the dust-collection motor 711 as in the above-described embodiment may be particularly useful in the chipping operation in which the operation of pressing the tool accessory 91 against a workpiece is relatively frequently released while the operation of depressing the trigger 261 is continued. Therefore, an impact tool (such as a hammer drill and an electric hammer) which is configured to perform chipping operation by linearly driving a tool accessory in the front-rear direction along a driving axis can be suitably adopted as the power tool.

The detecting device for detecting the operation of pressing the tool accessory 91 against a workpiece is not limited to the position sensor 61 of the above-described embodiment, and may be a different detecting device, and its arrangement position may also be changed. For example, a sensor of a non-contact type (such as an optical type) other than the magnetic-field-detection type sensor or a contact-type detecting mechanism (such as a mechanical switch) may be adopted. Further, a plurality of the position sensors 61 or other detecting devices may be provided, depending on the detecting method. For example, an impact tool is known which includes a movable unit configured to move rearward together with the tool accessory 91 relative to the body housing 21, in response to the operation of pressing the tool accessory 91 against a workpiece. In such a case, movement of the movable unit relative to the body housing 21 can be detected as the operation of pressing the tool accessory 91. Alternatively or additionally, a detecting device (such as a force sensor) for detecting forward pressing force may be provided on a grip part which is held by a user. A drilling tool may be provided with a detecting device (such as a force sensor) for detecting rearward pressing force of pressing a spindle which is configured to rotationally drive a tool accessory.

Further, in place of the trigger 261, a different operation member (such as a slider, a pushbutton or the like) which can be externally operated by a user may be adopted. The structure of the detecting device for detecting the ON/OFF state of the operation member may also be appropriately changed, depending on the operation member to be used.

In the above-described embodiment, the control circuit 50 of the hammer drill 2 and the control circuit 80 of the dust collector 7 respectively control driving of the driving motor 3 and the dust-collection motor 711, independently from each other. However, the control circuit 50 of the hammer drill 2 may control driving of the driving motor 3 and the dust-collection motor 711. Specifically, the control circuit 50 may perform both of the processings shown in FIGS. 8 and 9. Alternatively, the processings shown in FIGS. 8 and 9 may be distributed to a plurality of control circuits. In the above-described embodiment, the control circuits 50 and 80 are each formed by a microcomputer including a CPU, but may be formed, for example, by a programmable logic device such as an ASIC (Application Specific Integrated Circuit) and an FPGA (Field Programmable Gate Array).

The drive control processings of the driving motor 3 and the dust-collection motor 711 in the above-described embodiment (see FIGS. 8 and 9) may be appropriately modified or changed. Adoptable modifications of the drive control processings are now described.

For example, the initial rotation speed of the dust-collection motor 711 may be changed according to the load on the tool accessory 91 or the operation amount of the trigger 261, instead of being kept at a preset constant rotation speed. In this case, for example, in a case where the rotation speed set according to the load or the operation amount of the trigger 261 is not more than a preset upper limit speed, the control circuit 80 may use this rotation speed as the initial rotation speed. On the other hand, in a case where it exceeds the upper limit speed, the control circuit 80 may use the upper limit speed as the initial rotation speed. Further, in the above-described embodiment, in a case where the operation of pressing the tool accessory 91 and the operation of depressing the trigger 261 are both detected, the rotation speed is changed in a speed range higher than the initial rotation speed (see S75 in FIG. 9). However, in a case where the operations of pressing the tool accessory 91 and depressing the trigger 261 are both detected, the dust-collection motor 711 may be driven at a higher constant rotation speed than the initial rotation speed. Further, the initial rotation speed and the rotation speed to be changed from the initial rotation speed may be set via a setting member such as a dial, a pushbutton and a touch panel which can be externally operated by a user.

Figure 9:
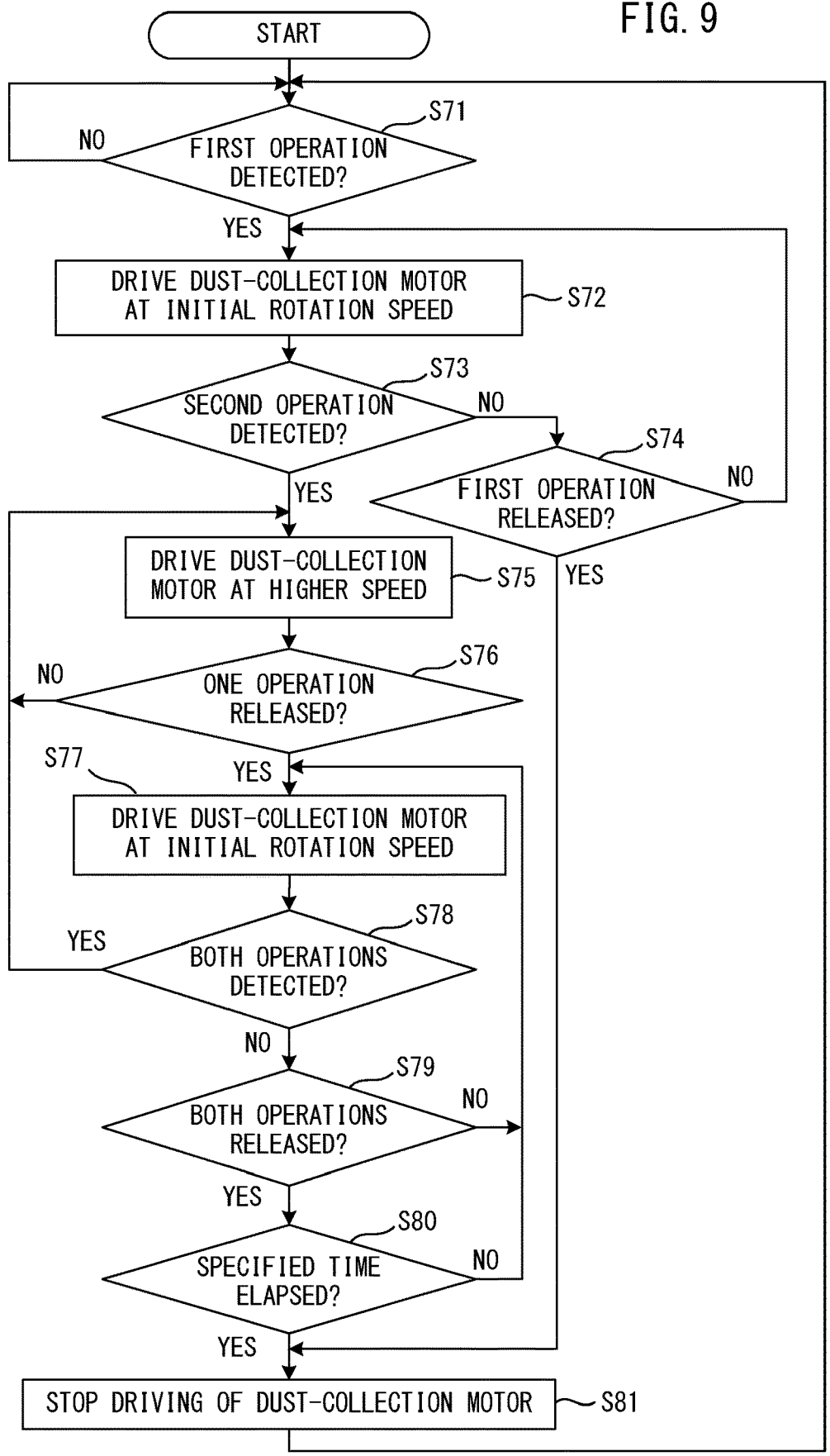
FIG. 9 is a flowchart showing drive control processing of a dust-collection motor.

In the above-described embodiment, in a case where either one of the operations of pressing the tool accessory 91 and depressing the trigger 261 is detected, driving of the dust-collection motor 711 is started at the initial rotation speed (see S72 in FIG. 9). However, only in a case where specific one of the operations of pressing the tool accessory 91 and depressing the trigger 261 is detected, driving of the dust-collection motor 711 may be started at the initial rotation speed. In other words, the first operation and the second operation may be defined as specific operations, respectively.

For example, the operation of depressing the trigger 261 and the operation of pressing the tool accessory 91 may be respectively defined as the first operation and the second operation. In this case, driving of the dust-collection motor 711 is started at the initial rotation speed when the operation of depressing the trigger 261 is detected. Thereafter, when the operation of pressing the tool accessory 91 is detected, the dust-collection motor 711 is driven at a higher speed (see S71 to S75 in FIG. 9). Similarly, when release of the operation of pressing the tool accessory 91 is detected during rotational driving at high speed, the rotation speeds of the driving motor 3 and the dust-collection motor 711 may be reduced to the respective initial rotation speeds, and when release of the operation of depressing the trigger 261 is further detected, the driving motor 3 and the dust-collection motor 711 may be stopped. Such a control may be particularly useful in an impact tool as described above.

The rotation speed of the driving motor 3 may be kept constant instead of being changed according to the load. Like the dust-collection motor 711 of the dust collector 7, the driving motor 3 may be driven at relatively low rotation speed when either one (or specified one) of the operations of pressing the tool accessory 91 and depressing the trigger 261 is detected, and then driven at higher rotation speed when both of the operations are detected.

The internal structure (including the driving motor 3, the driving mechanism 4 and the controller 5) of the hammer drill 2 and its arrangement may be appropriately changed. For example, the driving motor 3 may be a motor with a brush or an alternate current (AC) motor. As the driving mechanism 4, a motion-converting mechanism with a crank mechanism may be adopted, in place of the motion-converting mechanism with the swinging member.

The structure of elastically connecting the body housing 21 and the handle 25 may be appropriately changed. For example, the upper and lower end portions of the handle 25 may be connected to the body housing so as to be movable in the driving-axis-A1 direction (front-rear direction) relative to the body housing 21 via one or more elastic members. Alternatively, only the upper end portion of the handle 25 may be elastically connected to the body housing 21 in a cantilever manner. The arrangement of the position sensor 61 may be appropriately changed according to the change in the elastic connection structure. It may be preferable that the position sensor 61 is disposed in the handle 25 so as to be protected against vibration, but the position sensor 61 may be disposed in the body housing 21. In a case where a different structure other than the position sensor 61 is adopted as the detecting device for detecting the operation of pressing the tool accessory 91, the body housing 21 and the handle 25 may be configured to be immovable relative to each other. Further, a so-called vibration-isolating housing may be adopted in place of the housing structure of the above-described embodiment. The vibration-isolating housing may include a first housing which houses the driving motor 3 and the driving mechanism 4, and a second housing which includes a grip part and is elastically connected to the first housing so as to be movable in the front-rear direction relative to the first housing. In either case, not only a compression coil spring, but various other kinds of springs, rubber and synthetic resin can be used as the elastic member.

The battery-mounting part 271 may be provided not on the handle 25 but on the body housing 21. Further, the battery-mounting part 271 may be configured such that a plurality of batteries can be mounted thereto. Further, the hammer drill 2 may be configured to be connected to an external AC power source.

The structure of the dust collector 7 may also be appropriately changed. For example, the shapes and arrangements of the body housing 21, the sliding part 75 and the dust-transfer passage 77, the attaching/detaching structure of the dust collector 7 relative to the hammer drill 2, and the structures of the dust-collection motor 711 and the fan 713 may be appropriately changed. For example, the dust-collection motor 711 may be a brushless motor. Further, in a structure in which the control circuit 50 of the hammer drill 2 controls driving of the driving motor 3 and the dust-collection motor 711 as described above, the controller 8 may have only the drive circuit 81 without having the control circuit 80.

In view of the nature of the present invention and the above-described embodiment, the following features are provided. The following features can be used in combination with one or more of the above-described embodiment and its modifications and the claimed invention.

(Aspect 1)

The operation member is a trigger configured to be depressed by the user, and the second detecting device is a switch configured to be normally kept in an OFF state and turned ON in response to the operation of depressing the trigger.

(Aspect 2)

The power tool is an impact tool, and the driving mechanism is configured at least to linearly drive the tool accessory in the front-rear direction.

(Aspect 3)

The body housing has a battery-mounting part configured to removably receive a battery, and the power tool and the dust collector are configured to operate with electric power supplied from the battery.

(Aspect 4)

The dust collector is configured to be removably attached to the power tool, and the power tool and the dust collector have respective connectors configured to be electrically connected to each other when the dust collector is attached to the power tool.

DESCRIPTION OF THE NUMERALS

1: dust collecting system, 2: hammer drill, 21: body housing, 211: driving-mechanism-housing part, 213: stopper part, 217: motor-housing part, 218: protruding part, 25: handle, 26: grip part, 261: trigger, 263: switch, 27: controller-housing part, 271: battery-mounting part, 28: lower connection part, 281: shaft part, 283: recess, 285: elastic member, 29: upper connection part 291: elastic member, 293: elongate hole, 3: driving motor, 31: motor shaft, 4: driving mechanism, 49: tool holder, 5: controller, 50: control circuit, 51: drive circuit, 53: Hall sensor, 55: current-detecting amplifier, 59: connector, 61: position sensor, 62: board, 66: magnet, 7: dust collector, 70: body housing, 701: sliding-guide part, 703: connector part, 705: motor-housing part, 711: dust-collection motor, 713: fan, 715: connector, 73: dust case, 735: filter, 75: sliding part, 751: first tubular part, 752: second tubular part, 753: cover part, 754: suction port, 77: dust-transfer passage, 771: hose, 772: spring, 775: hose connecting part, 8: controller, 80: control circuit, 81: drive circuit, 91: tool accessory, 93: battery, A1: driving axis, A2: pivot axis, A3: sliding axis

What is claimed is:

1. A dust collecting system including a power tool configured to perform a processing operation on a workpiece by driving a tool accessory and a dust collector configured to collect dust generated by the processing operation, the tool accessory being attached to the power tool so as to extend along a driving axis defining a front-rear direction, wherein:

the power tool comprises:
a first motor;
a driving mechanism configured to drive the tool accessory by power of the first motor;
a body housing that houses the first motor and the driving mechanism;
a first detecting device configured to detect an operation of pressing the tool accessory against the workpiece;
an operation member configured to be externally operated by a user; and
a second detecting device configured to detect an operation of the operation member, the dust collector comprises:
a second motor; and
a fan configured to be rotationally driven by the second motor to generate air flow for collecting the dust;

the dust collecting system comprises (i) a first control device configured to control driving of the second motor based on detection results of the first detecting device and the second detecting device (ii) a second control device configured to control driving of the first motor based on the detection results of the first detecting device and the second detecting device;
the first control device is configured to start driving of the second motor when one of the following occurs: (i) the first detecting device detects the operation of pressing the tool accessory against the workpiece and (ii) the second detecting device detects the operation of the operation member; and
the second control device is configured to start driving of the first motor when both of the following occur: (i) the first detecting device detects the operation of pressing the tool accessory against the workpiece and (ii) the second detecting device detects the operation of the operation member.

2. The dust collecting system as defined in claim 1, wherein:
the first control device is configured to drive the second motor at a first rotation speed when only one of the following occurs: (i) the first detecting device detects the operation of pressing the tool against the workpiece and (ii) the second detecting device detects the operation of the operation member;
the first control device is configured to drive the second motor at a second rotation speed when both of the following occur: (i) the first detecting device detects the operation of pressing the tool accessory against the workpiece and (ii) the second detecting device detects the operation of the operation member; and
the second rotation speed is faster that the first rotation speed.

3. The dust collecting system as defined in claim 1, wherein:
the first detecting device is configured to detect information corresponding to a load applied to the tool accessory by the pressing operation, and
the first control device is configured to change a rotation speed of the second motor according to the load.

4. The dust collecting system as defined in claim 3, wherein the second control device is configured to change a rotation speed of the first motor according to the load.

5. The dust collecting system as defined in claim 4, wherein:
the first control device is in the dust collector, and
the second control device is in the power tool.

6. The dust collecting system as defined in claim 1, wherein:
the first control device is configured to drive the second motor at a first rotation speed for a specified period of time and then stop driving of the second motor when the first detecting device detects that the operation of pressing the tool accessory is released and the second detecting device detects that the operation of the operation member is released during driving of the second motor.

7. The dust collecting system as defined in claim 6, wherein the second control device is configured to stop driving of the first motor when the first detecting device detects that the operation of pressing the tool accessory is released and the second detecting device detects that the operation of the operation member is released during driving of the first motor.

8. The dust collecting system as defined in claim 1, wherein:

the power tool comprises an elastic-connection part elastically connected to the body housing so as to be movable in the front-rear direction relative to the body housing,
the elastic-connection part includes a grip part configured to be held by a user, and
the first detecting device is configured to detect forward movement of the elastic-connection part relative to the body housing as the operation of pressing the tool accessory.

9. The dust collecting system as defined in claim 8, wherein:
the first control device is configured to drive the second motor at a first rotation speed for a specified period of time and then stop driving of the second motor when the first detecting device detects that the operation of pressing the tool accessory is released and the second detecting device detects that the operation of the operation member is released during driving of the second motor.

10. The dust collecting system as defined in claim 9, further comprising:
the second control device is configured to stop driving of the first motor when the first detecting device detects that the operation of pressing the tool accessory is released and the second detecting device detects that the operation of the operation member is released during driving of the first motor.

11. The dust collecting system as defined in claim 10, wherein:
the first detecting device is configured to detect information corresponding to a load applied to the tool accessory by the pressing operation, and
the first control device is configured to change a rotation speed of the second motor according to the load.

12. The dust collecting system as defined in claim 11, wherein the second control device is configured to change a rotation speed of the first motor according to the load.

13. The dust collecting system as defined in claim 12, wherein:
the first control device is in the dust collector, and
the second control device is in the power tool.

14. A dust collecting system including a power tool configured to perform processing operation on a workpiece by driving a tool accessory and a dust collector configured to collect dust generated by the processing operation, the tool accessory being attached to the power tool so as to extend along a driving axis defining a front-rear direction, wherein:
the power tool comprises:
a first motor;
a driving mechanism configured to drive the tool accessory by power of the first motor;
a body housing that houses the first motor and the driving mechanism;
a first detecting device configured to detect an operation of pressing the tool accessory against the workpiece;
an operation member configured to be externally operated by a user; and
a second detecting device configured to detect an operation of the operation member,
the dust collector comprises:
a second motor; and
a fan configured to be rotationally driven by the second motor to generate air flow for collecting the dust;

the dust collecting system comprises a first control device configured to control driving of the second motor based on detection results of the first detecting device and the second detecting device; and the first control device is configured to drive the second motor at a first rotation speed for a specified period of time and then stop driving of the second motor when the first detecting device detects that the operation of pressing the tool accessory is released and the second detecting device detects that the operation of the operation member is released during driving of the second motor.

15. The dust collecting system as defined in claim 14, further comprising:

a second control device configured to control driving of the first motor based on the detection results of the first detecting device and the second detecting device, wherein:

the second control device is configured to stop driving of the first motor when the first detecting device detects that the operation of pressing the tool accessory is released and the second detecting device detects that the operation of the operation member is released during driving of the first motor.

* * * * *